United States Patent [19]

Heeb et al.

[11] 3,996,153
[45] Dec. 7, 1976

[54] AEROSOL PROPELLANT

[75] Inventors: Dieter Heeb; Volker Böllert, both of Hamburg, Germany

[73] Assignee: Hans Schwarzkopf GmbH, Hamburg, Germany

[22] Filed: May 22, 1974

[21] Appl. No.: 472,581

[30] Foreign Application Priority Data

May 26, 1973 Germany .......................... 2327067

[52] U.S. Cl. ................................. 252/305; 252/69; 424/45; 424/47
[51] Int. Cl.² .................................... C09K 3/30
[58] Field of Search .............. 252/305, 69; 424/45, 424/47

[56] References Cited
UNITED STATES PATENTS

| | | | |
|---|---|---|---|
| 1,800,156 | 4/1931 | Rotheim | 239/309 X |
| 2,321,023 | 6/1943 | Goodhue et al. | 252/305 X |
| 3,387,425 | 6/1968 | Flanner | 252/305 X |
| 3,789,118 | 1/1974 | Broerman | 424/45 |

FOREIGN PATENTS OR APPLICATIONS 748,285  12/1966  Canada ............................. 252/305

*Primary Examiner*—Richard D. Lovering
*Attorney, Agent, or Firm*—Beveridge, DeGrandi, Kline & Lunsford

[57] ABSTRACT

A propellant composition which can be sprayed from a compressed gas container comprises a solvent or mixture of solvents having a vaporization number of about 1 to about 15 and a gaseous propellant absorption capacity of about 1 to about 15 weight percent at 20° C. The solvent or mixture of solvents has a substantial portion of a gaseous propellant dissolved therein. The gaseous propellant is carbon dioxide. The propellant composition is suitable for use in compressed gas containers such as those employed with hairsprays, deodorant sprays, room sprays, etc.

3 Claims, 8 Drawing Figures

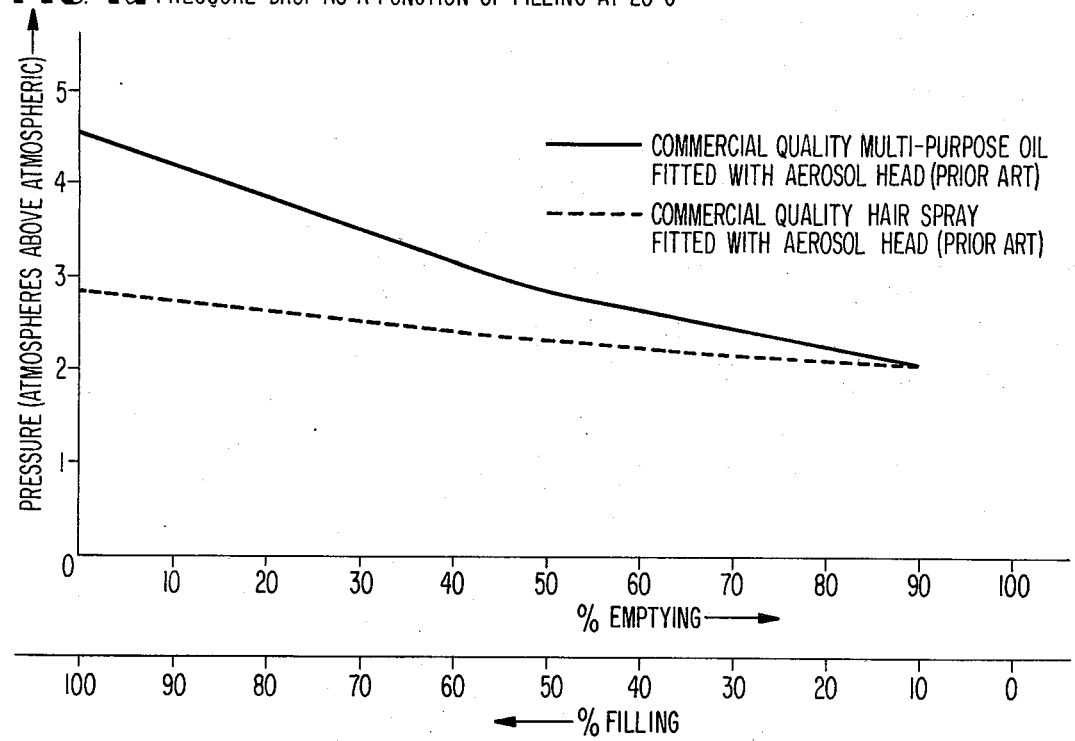
FIG. 1a PRESSURE DROP AS A FUNCTION OF FILLING AT 20°C
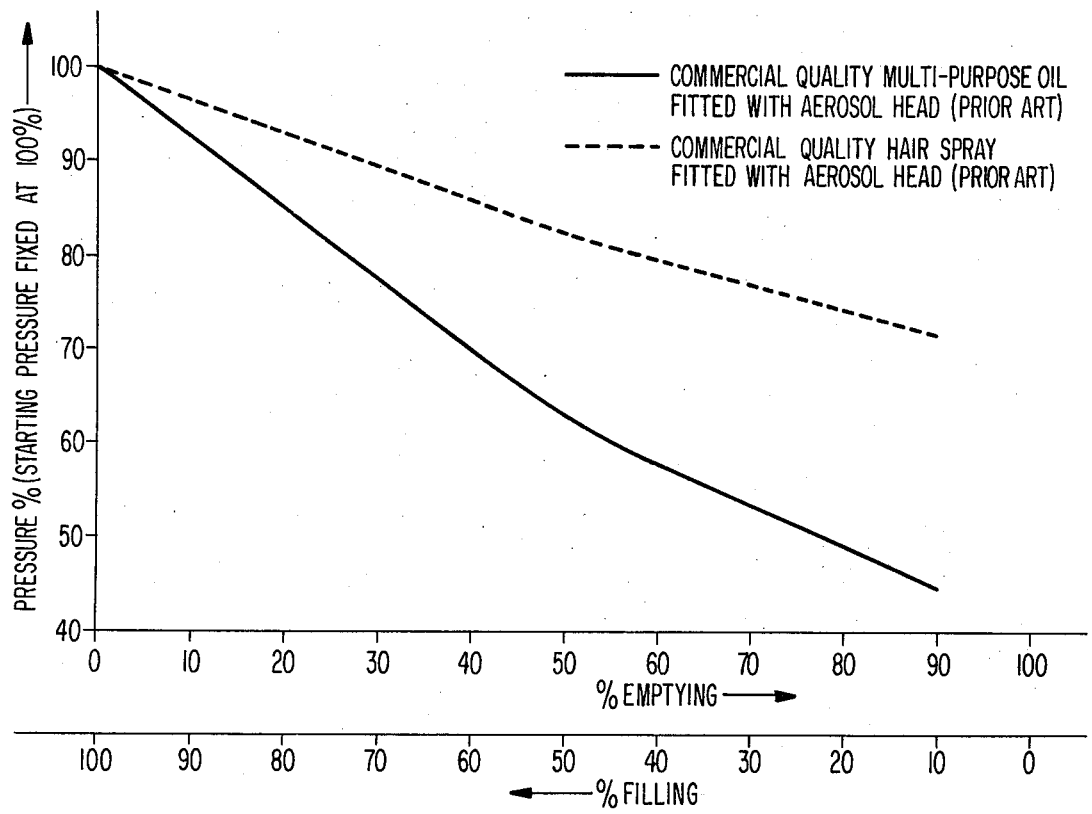
FIG. 1b PERCENTAGE PRESSURE DROP AS A FUNCTION OF FILLING AT 20°C

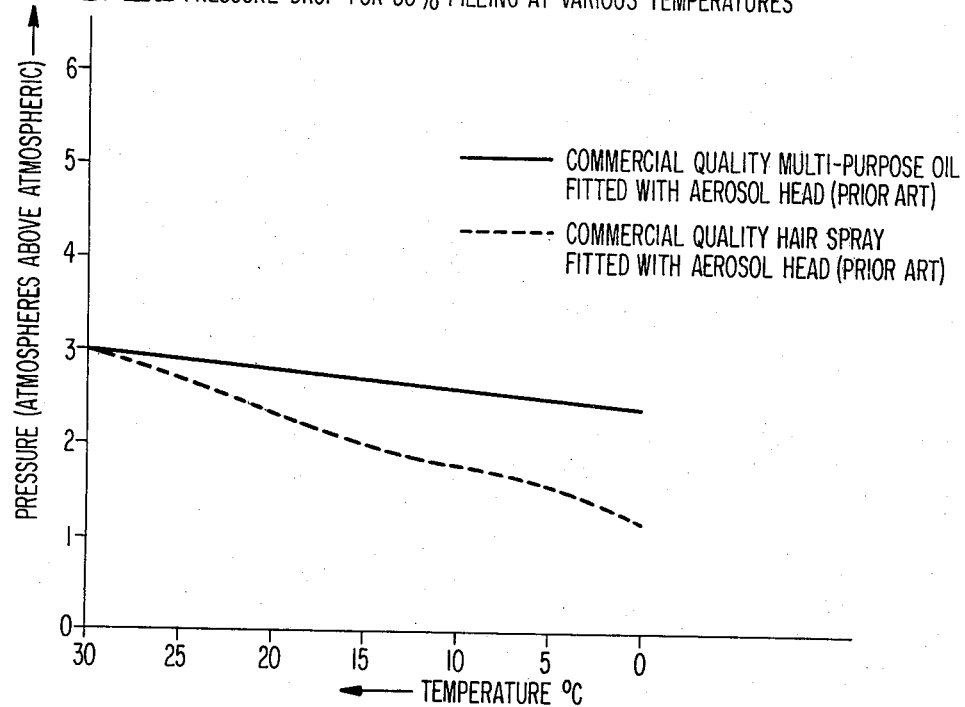
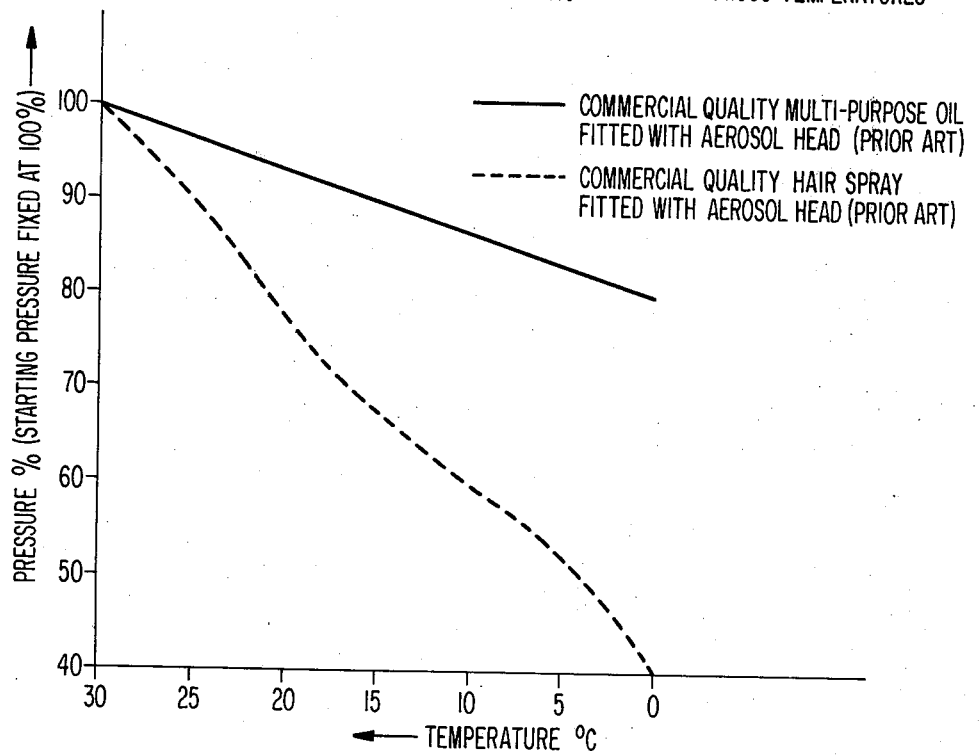

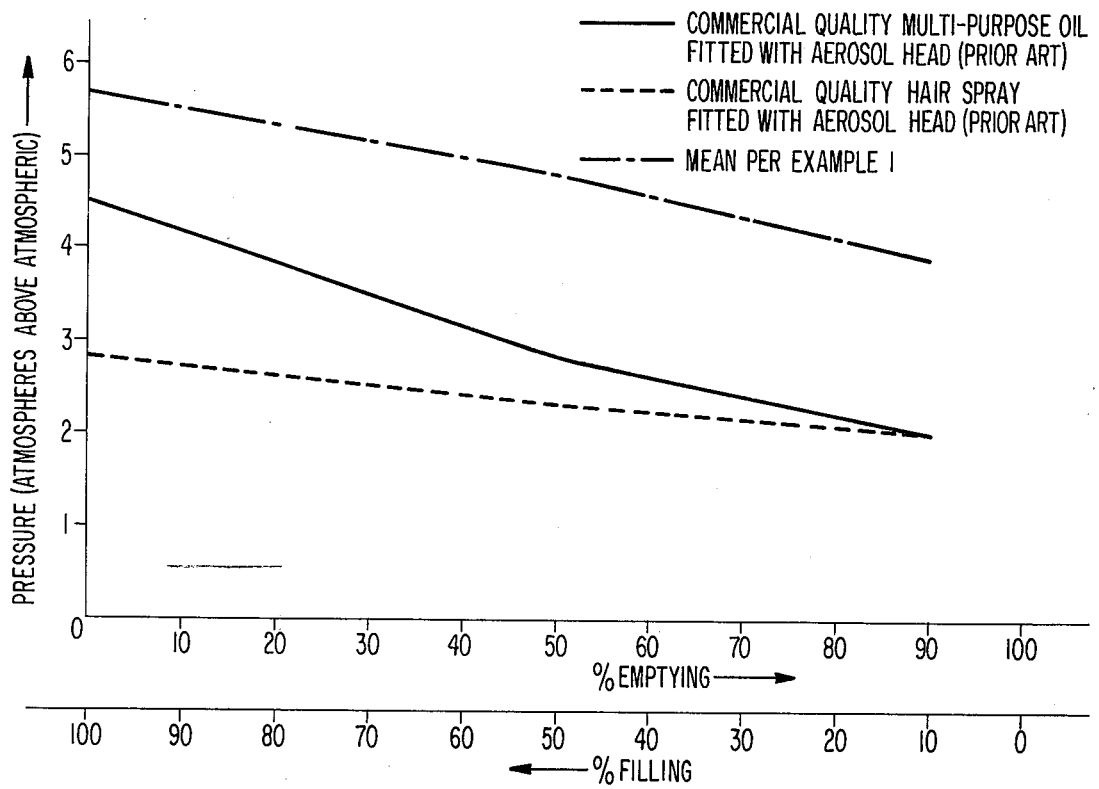
FIG. 3a PRESSURE DROP AS A FUNCTION OF FILLING AT 20°C
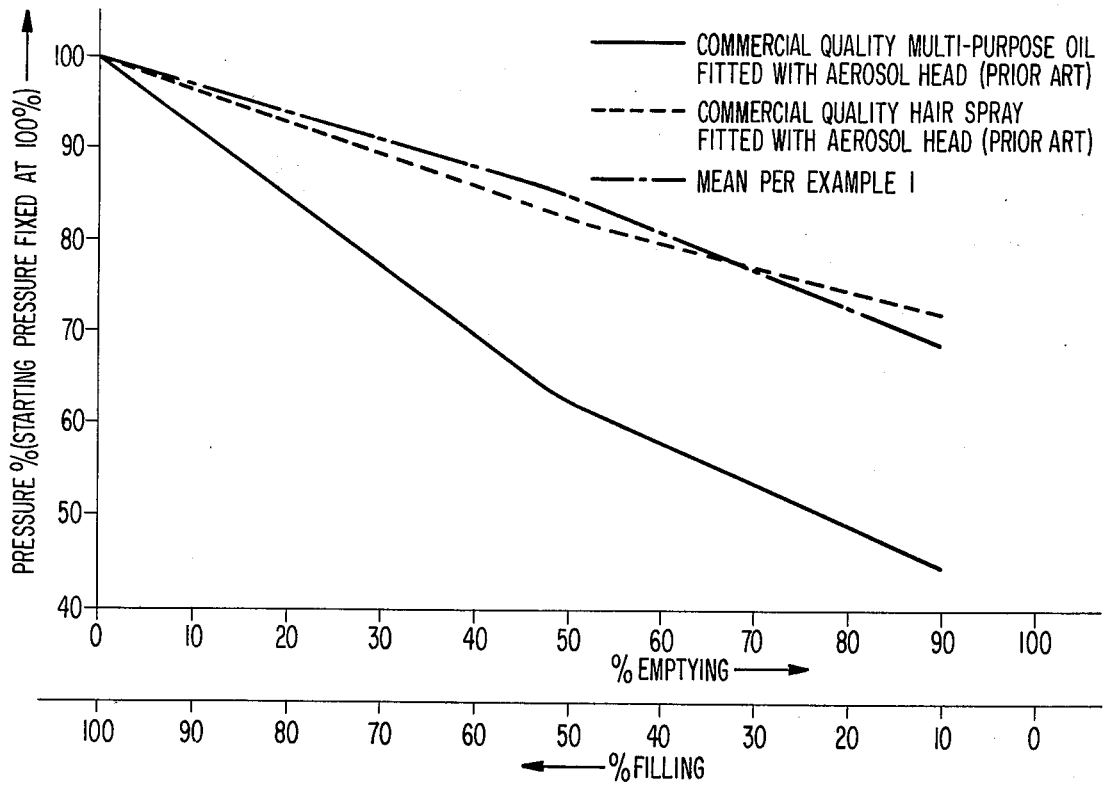
FIG. 3b PERCENTAGE PRESSURE DROP AS A FUNCTION OF FILLING AT 20°C

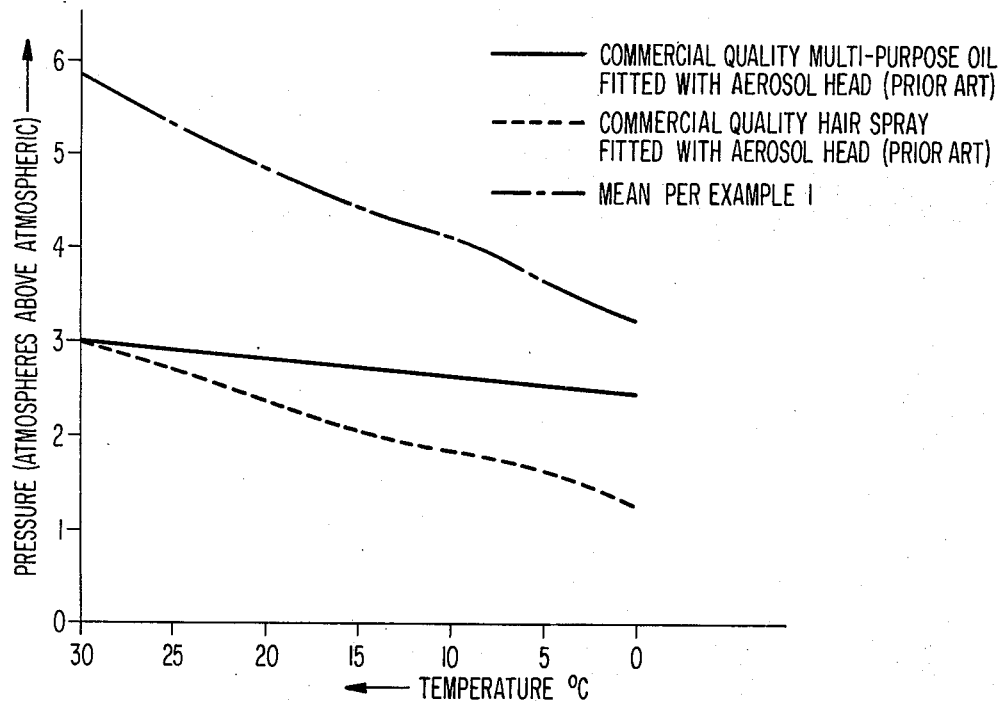
FIG. 4a PRESSURE DROP FOR 50% FILLING AT VARIOUS TEMPERATURES
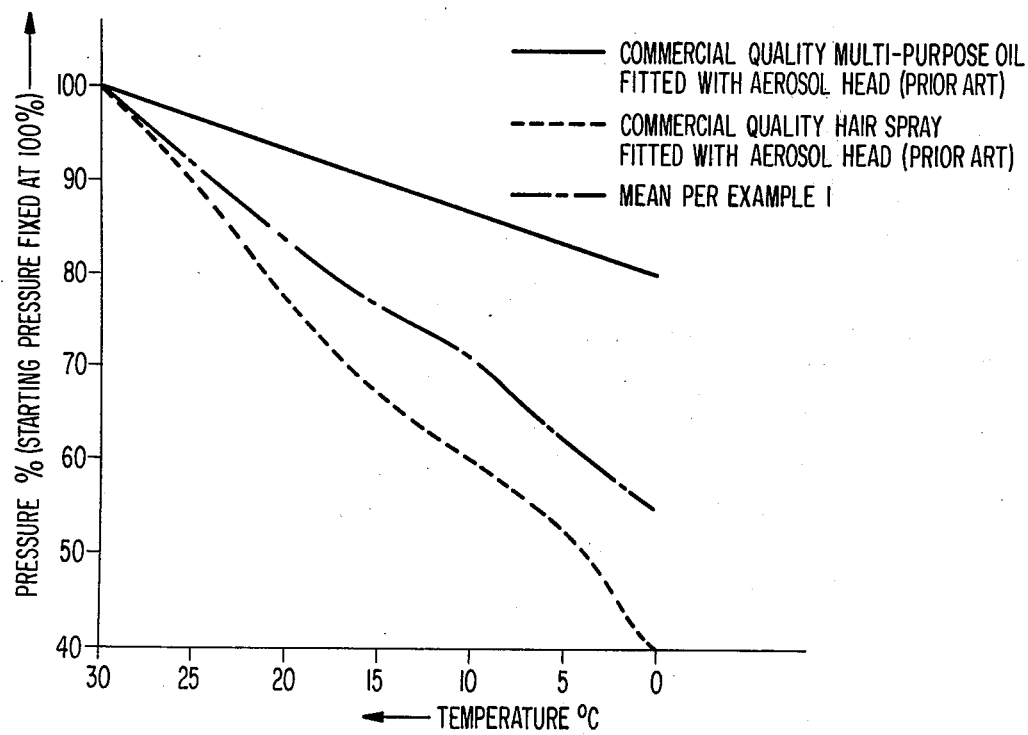
FIG. 4b PERCENTAGE PRESSURE DROP FOR 50% FILLING AT VARIOUS TEMPERATURES

AEROSOL PROPELLANT

This invention relates to a gaseous propellant, an aerosol composition containing the propellant and a package containing the propellant in compressed form.

According to the present state of the art, there are several specific differences between aerosol compositions based on gaseous propellants and aerosol compositions based on liquid propellants. Gaseous propellants have the property of changing from a gaseous state to a liquid state when pressure is applied below the critical temperature.

The gases currently employed as "liquid" propellants can be liquified at the pressures which can be tolerated in compressed gas packages. Typical of these liquified gaseous propellants are fluorinated chlorohydrocarbons and pure hydrocarbons. These propellants separate into a liquid phase and a gaseous phase in the compressed gas package. The liquid phase serves as a pressure reserve. If the pressure drops at the moment of spraying, then a portion of the liquified gas immediately vaporizes, and the original pressure is practically completely restored. The pressure remains substantially constant within the compressed gas package from the time of its first use until the package is practically empty. These packages, however, are subject to pressure variations upon changes in temperature. When the temperature rises, the pressure increases. A drop in temperature causes a reduction in pressure which does not allow the compressed gas package to function properly. For example, compressed gas packages containing liquid propellants designed for a working temperature of 20° C exhibit a substantially impaired spray pattern at temperatures below 10° C. This can be particularly disadvantageous if compressed gas packages are taken from cool storage areas into warmer areas.

It may take several hours for the compressed gas filling to reach the usual room temperature of approximately 20° C. The user of such compressed gas packages regards them as defective although immersion of the package in warm water, such as at a temperature of 20° – 25° C, for a short duration would result in the packages emitting a normal spray pattern.

The gases which find application as gaseous propellants cannot be liquified at the pressures employed in commercial compressed gas packages. When they are used in compressed gas packages, the gaseous propellants remain in substantially gaseous form above the solution which is to be sprayed. Thus, there is no liquid phase present which can bring about an equalization of pressure when gaseous propellant is withdrawn from the package. These packages are characterized by a large drop in pressure between the first use of the package and the time at which the package filling is minimal. On the other hand, such packages are advantageous in that the effect of temperature variations is neglegible.

FIGS. 1a and 1b compare the drop in pressure of a commercially available aerosol having a liquified propellant gas (commercially available hair spray fitted with a spray head) with the drop in pressure of a commercially available aerosol having a gaseous propellant (commercially available multi-purpose oil fitted with a spray head). FIG. 1a represents the absolute pressure drop, while FIG. 1b represents the percentage pressure drop. It is evident from the FIGS. that the pressure drop is substantially greater in the case of the aerosol having the gaseous propellant than with the aerosol having the liquid propellant.

FIGS. 2a and 2b compare the variation in pressure as a function of temperature or a 50% degree of filling using an aerosol having a gaseous propellant (commercial multi-purpose oil equipped with a spray head) and an aerosol based on a liquid propellant (commercially available hair spray fitted with a spray head). FIG. 2a represents the absolute pressure drop, while FIG. 2b represents the percentage pressure drop. It is evident from these Figures that as the temperature decreases, there is a markedly smaller pressure drop for the aerosol having a gaseous propellant than with the aerosol having a liquid propellant.

All-in-all, therefore, the compressed gas package containing a liquid propellant offers the advantage of constant pressure from the first until the last application. At the same time, however, it does have the disadvantage of considerable susceptibility to temperature variations. On the other hand, the conventional compressed gas package containing a gaseous propellant has the advantage of less susceptibility to temperature fluxuation, but it does have the disadvantage of a marked decrease in pressure from the first to the last application. According to the present state of the art, it is generally accepted that the advantages of the liquid propellant in a compressed gas package are substantially more important.

Thus, there exists a need in the art for a propellant composition, an aerosol spray composition and a spray package which combines the advantages associated with gaseous propellants and liquid propellants while substantially reducing the disadvantages associated with prior art propellants.

It has been found that the advantages of both systems can be substantially preserved, while the disadvantages of both systems are substantially eliminated. Accordingly, this invention provides a propellant composition which can be sprayed from a compressed gas package. The propellant comprises at least one solvent having wholly or predominantly dissolved therein a gaseous propellant. The solvent or a mixture of solvents has a vaporization number of about 1 to about 15 and a gaseous propellant absorption capacity of about 1 to about 15 weight percent at 20° C. The gaseous propellant is carbon dioxide.

This invention also provides an aerosol composition comprising the propellant composition of this invention and a liquid or cream-form product intended to be sprayed from a compressed gas package.

Further, this invention provides a compressed gas package containing the propellant composition of this invention.

It has been found that special solvents or mixtures of solvents can be used in combination with gaseous propellants. Surprisingly, the gaseous propellants are dissolved in these solvents or solvent mixtures to such a great extent that the gaseous propellants behave virtually as a liquid propellant. When the gaseous propellants are dissolved in the solvent or solvent mixture, they provide a reserve of pressure from the first to the last application in a manner similar to that provided by liquified gaseous propellants. At the same time, the above-described disadvantages associated with liquid propellants, namely their great susceptibility to temperature variation, is substantially avoided.

Suitable solvents for use in practicing in this invention are those, for example, having a vaporization number of about 1 to about 15, and a gaseous propellant absorption capacity of about 1 to about 15 weight percent at 20° C. As used herein, the expression gaseous propellant absorption capacity refers to the absorption capacity at an equilibrium pressure of six atmospheres for a 70% utilization of the canned volume by the liquid phase at 20° C.

Typical of the solvents which can be employed in this invention are aliphatic and cycloaliphatic hydrocarbons, for example, Isopar E ($C_8$-$C_9$ hydrocarbons having a boiling range of 116° – 142° C at 760 mm); aliphatic and cycloaliphatic ketones, for example, acetone; aliphatic and cycloaliphatic alcohols, for example, isopropanol; aliphatic and cycloaliphatic halogenated hydrocarbons, for example, methylene chloride; aliphatic and cycloaliphatic mono- and/or polycarbonic acid esters, for example, acetic acid ethyl esters; and aliphatic and cycloaliphatic carbon dioxide esters, for example, diethyl carbonate.

FIGS. 3a and 3b show the pressure behavior of a propellant composition (Example 1) of this invention as a function of the degree of filling. FIG. 3a shows the absolute pressure drop, while FIG. 3b shows the percentage pressure drop. For purposes of comparison, the corresponding curves from FIS. 1a and 1b for a commercially available aerosol based on gaseous propellant and a commercially available aerosol based on a liquid propellant are included in these Figures.

It can be clearly seen that the pressure associated with the propellant of this invention drops less than the pressure associated with a conventional aerosol based on a gaseous propellant; the pressure characteristics of the propellant of this invention resemble the pressure characteristics for the conventional aerosol based on the liquid propellant.

FIGS. 4a and 4b show the variation in pressure for a propellant composition (according to Example 1) of this invention as a function of the temperature at a 50% degree of filling. FIG. 4a depicts the actual pressure drop, while FIG. 4b shows the percentage pressure drop. For comparison, the curves from FIGS. 2a and 2b have been included. The propellant composition of this invention exhibits a smaller variation in pressure with falling temperature than does the commercially available aerosol based on the liquid propellant. In contrast to the latter, the propellant composition of this invention still exhibits a workable pressure even at 0° C.

The favorable spray characteristics of the propellant composition of this invention are confirmed by electronic measurements using the measuring technique established by Messrs. Newman Green (SOFW 22nd year, 1970, pp. 788–893).

In addition to the previously described advantages from the point of view of application, the aerosol system of this invention has additional advantages. It makes it possible to produce substantially more competitive priced products. Furthermore, it provides an opportunity of working with solvent-gas systems which have good toxicity and tolerability levels, and which do not yield toxic decomposition products.

The propellant of the aerosol system of this invention, carbon dioxide, is non-toxic as a constituent of the atmosphere; it provides plants with water with which to build carbohydrates.

This invention will be more clearly understood by reference to the following examples in which all part, portions, percentages and ratios are by weight unless otherwise indicated.

EXAMPLE 1

346 g of a mixture consisting of:
25% by weight methylene chloride, and
75% by weight acetone
are placed in an 18 oz. Bodymaker aerosol can. The can is closed with a commercially available valve. Then gas is applied, i.e. 29 g $CO_2$, after which a commercially available aerosol head is fitted.

The aerosol system exhibits a compressed gas pattern such as is shown in FIGS. 3a, 3b, 4a and 4b.

The spraying characteristics as measured by the Newman Green method exhibit in their temperature dependency advantages with respect to a commercially available aerosol based on a liquid propellant, while as a function of the degree of filling they exhibit advantages over a commercially available aerosol based on a gaseous propellant.

The aerosol system can find application as a hairspray, deodorant spray, room spray, etc., by adding appropriate agents to the solvent mixture.

EXAMPLE 2

A mixture consisting of:
25% by weight methylene chloride,
37.5% by weight acetone, and
37.5% by weight ethyl acetate
is used, and the procedure according to Example 1 followed. The spraying pattern and spraying characteristics correspond substantially to the composition of Example 1.

EXAMPLE 3

The same procedure outlined in Example 1 is employed. The propellant consists of:
25% by weight methylene chloride,
37.5% by weight acetone, and
37.5% by weight isopropyl alcohol.
The spraying pattern and spraying characteristics correspond substantially to the composition of Example 1.

EXAMPLE 4

A similar procedure was adopted as in Example 1, using a mixture consisting of:
25% by weight methylene chloride,
37.5% by weight acetone, and
37.5 by weight ethyl alcohol.
The spraying pattern and spraying characteristics substantially correspond to the propellant of Example 1.

EXAMPLE 5

248 g of a mixture consisting of:
45% by weight methylene chloride, and
55% by weight diethyl carbonate
are placed in an 18 oz. Bodymaker aerosol can. The can is closed with a commercially available valve after which 22 g $CO_2$ gas are introduced. Then a commercial quality aerosol head is fitted on the valve. The spraying pattern and spraying characteristics largely correspond to similar characteristics for the composition of Example 1.

EXAMPLE 6

308 g of a mixture consisting of:
80% by weight acetone,
10% by weight Isopar E (hydrocarbon $C_8$–$C_9$; boiling range 116°- 142° C at 760 mm Hg), and
10% by weight ethyl acetate are placed in an 18 oz. Bodymaker aerosol can. The can is closed with a commercially available valve after which 28 g $CO_2$ are added. Then a commercial quality aerosol head is fitted on the valve. The spraying pattern and spraying characteristics largely correspond to the composition of Example 1.

In practicing this invention, the solvent or mixture of solvents employed in the propellant composition has a gaseous propellant (i.e. carbon dioxide) absorption capacity of about 1 to about 15 weight percent, preferably about 2 to about 10 weight percent, at 20° C. Absorption capacity is a gravimetrical determination of the saturation point as measured at an equilibrium pressure of six atmosphere and constant temperature of 20° C. in an aerosol dosage. In the propellant composition of this invention, the carbon dioxide comprises about 1 to about 15 weight percent, preferably about 2 to about 10 weight percent of the composition. The determination of the vaporization number of the solvent or mixture of solvents can be readily determined according to German Industrial Standard DIN 53 170. Furthermore, raw material manufacturers generally make available to the public the vaporization number of solvents which they produce. For example, Farbwerke Hoechst in the publication "Losungsmittel" (1966) discloses such data. Typical of the solvents which have vaporization numbers of about 1 to about 15 are:

| (1) Propyl acetate | (12) Tertiary Butanol |
|---|---|
| (2) Isopropyl acetate | (13) 1,1,1-Trichlorethanol |
| (3) Butyl acetate | (14) Methylchloride |
| (4) Isobutyl acetate | (15) Trichlorofluoromethane |
| (5) Diethyl carbonate | (16) Methyl acetate |
| (6) Petroleum ether | (17) Ethyl acetate |
| (7) Cyclohexane | (18) Methyl cyclohexane |
| (8) Methylisobutyl ketone | (19) Dimethyl ketone |
| (9) Ethanol | (20) Methylethyl ketone |
| (10) n-Hexane | (21) 1,1,2-Trichloro-1,2,2'-Trifluorethanol |
| (11) Isopropanol | |

What is claimed is:
1. A propellant composition which can be sprayed from a compressed gas container, said propellant composition comprising:
   a. a solvent mixture comprised of methylene chloride and diethyl carbonate; and
   b. carbon dioxide dissolved in said solvent in an amount of about 1 to about 15 weight percent;
wherein said solvent or solvent mixture has a vaporization number of about 1 to about 15 and a gaseous propellant absorption capacity of about 1 to about 15 weight percent at 20° C.

2. A propellant composition which can be sprayed from a compressed gas container, said propellant composition consisting essentially of:
   a. diethyl carbonate; and
   b. carbon dioxide dissolved in said solvent
in an amount of about 1 to about 15 weight percent.

3. Propellant composition according to claim 1 wherein compound (a) is a solvent mixture comprising diethyl carbonate and at least one solvent selected from the group consisting of acetone, ethyl acetate, isopropyl alcohol, ethyl alcohol and hydrocarbons having a boiling range of about 116° to about 142° C at 760 mm Hg.

* * * * *